United States Patent [19]

Piepho et al.

[11] 4,022,536

[45] May 10, 1977

[54] HINGE PIN CONSTRUCTION

[75] Inventors: Donald A. Piepho, Aurora; Frederick L. Knop, Jr., East Peoria, both of Ill.

[73] Assignee: Caterpillar Tractor Co., Peoria, Ill.

[22] Filed: Apr. 5, 1976

[21] Appl. No.: 673,506

[52] U.S. Cl. .................................. 403/16; 403/154; 403/163; 403/370; 403/371

[51] Int. Cl.² ........................................ B23P 19/04

[58] Field of Search ............ 403/16, 154, 163, 370, 403/371, 47

[56] References Cited

UNITED STATES PATENTS

| | | | |
|---|---|---|---|
| 2,529,963 | 11/1950 | Prodromos | 403/370 X |
| 2,718,155 | 9/1955 | Firth | 403/370 X |
| 2,872,222 | 2/1959 | Gohlke | 403/16 |
| 3,129,937 | 4/1964 | Miller | 403/16 X |
| 3,841,771 | 10/1974 | Shankwitz | 403/163 |

*Primary Examiner*—Andrew V. Kundrat
*Attorney, Agent, or Firm*—; Wegner, Stellman, McCord, Wiles & Wood

[57] ABSTRACT

A hinge pin construction including a pin adapted to journal an arm or the like, an annular wedge member associated with one end of the pin, a collet receivable on the wedge member, a bolt extending through the collet to be threadably received in a bore in a pin, the bolt also being threadably received in the collet. The threads in the collet have a lesser pitch than the threads in the bore so as to provide a differential action to properly seat the collet on the wedge member with a minimum of friction.

4 Claims, 7 Drawing Figures

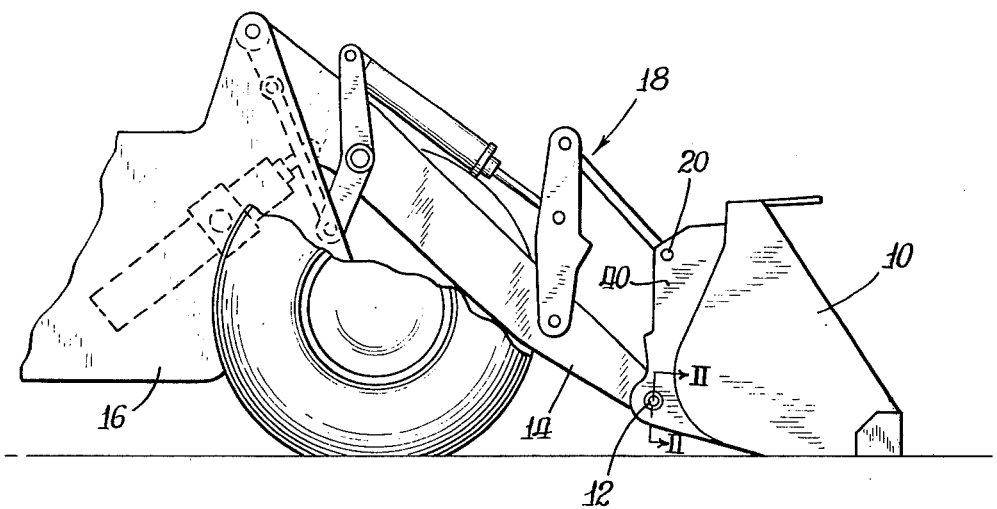
Fig_1_
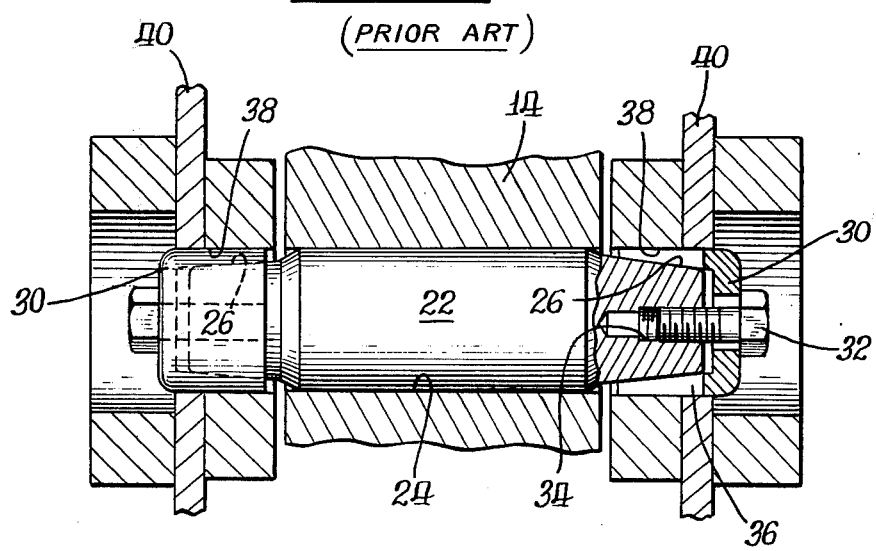
Fig_2_
(PRIOR ART)

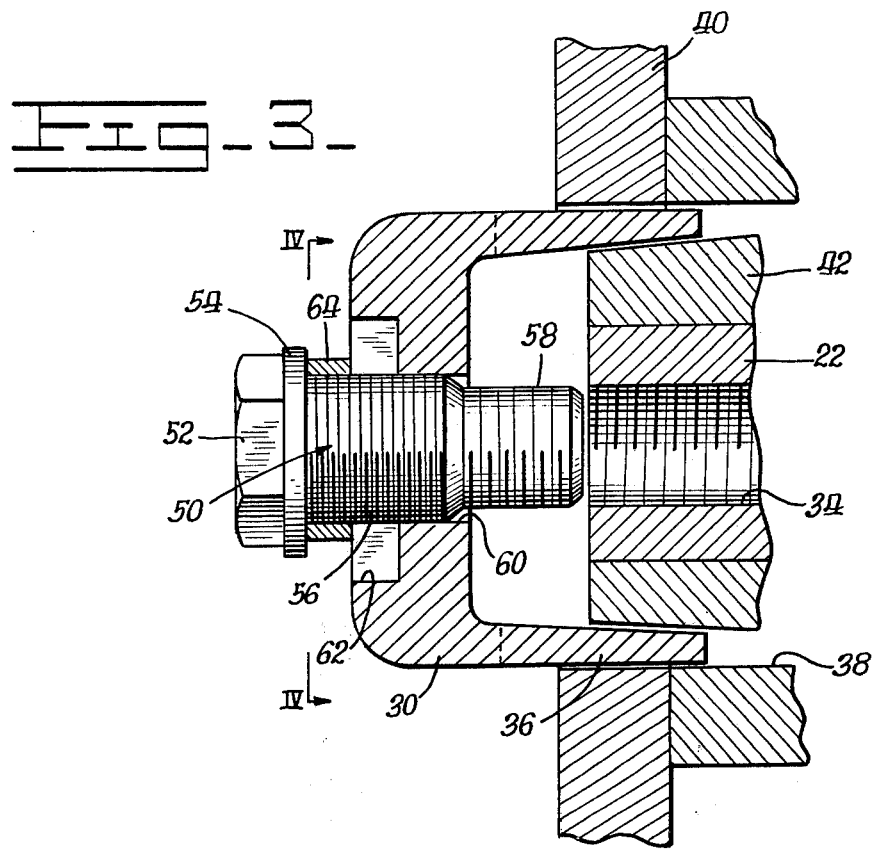
Fig_3_
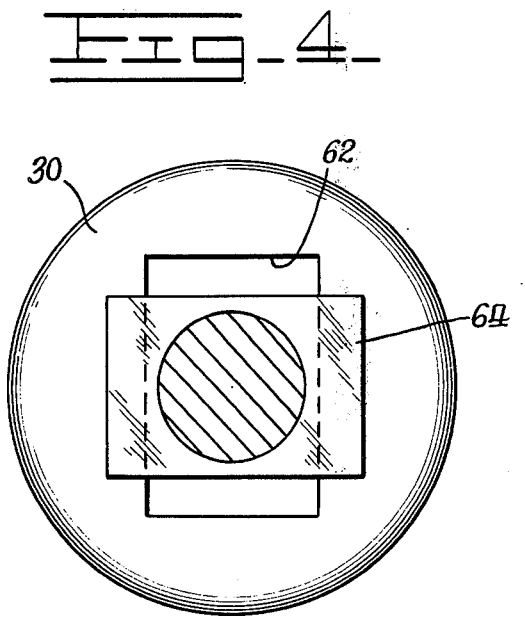
Fig_4_
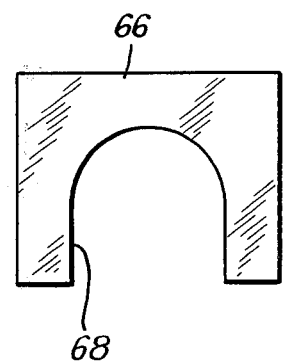
Fig_5_

HINGE PIN CONSTRUCTION

BACKGROUND OF THE INVENTION

This invention relates to hinge pin assemblies and, more particularly, to such assemblies having wedge members for receiving collets.

Prior art of possible relevance includes United States Pat. No. 3,841,771 issued Oct. 15, 1974 to Shankwitz et al.

Hinge pin assemblies, such as those illustrated in the above identified patent of Shankwitz el al have proved quite satisfactory in operation. Nonetheless, improvement thereover is sought, particularly in terms of obviating any need for separate elements to be used as "puller" assemblages for removing collets from wedge members and in terms of providing a construction wherein the collet may be properly seated upon wedge members with a minimum of friction during the assembly process.

SUMMARY OF THE INVENTION

It is the principal object of the invention to provide a new and improved hinge pin construction. More specifically, it is an object of the invention to provide such a construction wherein collets may be properly seated on wedges with a minimum of friction and which may be easily removed from wedge members without requiring separate puller devices or tools.

An exemplary embodiment of the invention achieves the foregoing object in a hinge pin construction including a pin adapted to journal an arm or the like, an annular wedge member associated with one end of the pin, a collet receivable on the wedge member, and a bolt extending through the collet to be threadably received in a bore in the pin. The bolt is also threadably received in the collet and the threads in the collet have a lesser pitch than the threads in the bore. As a consequence, during assembly, a differential action is present allowing proper assemblage with a minimum of friction. At the same time, by loosening the bolt, a "puller" action will occur to ensure removal of the collet from the wedge member without the need of separate puller tools or instrumentalities.

In a preferred embodiment of the invention, the bolt has two portions of different diameters, the larger diameter being adjacent the head of the bolt and having the lesser pitch threads thereon.

Preferably, the assemblage includes selectively operable spacer means disposed between the head of the bolt and the collet. In one embodiment, the spacer means comprise a removable shim, while in another embodiment, the collet, adjacent the bolt head, is provided with an elongated recess. The spacer means comprises an elongated shim pivotally impaled on the bolt and sized to be receivable in the recess. The same may thus be pivoted between a position bridging the recess to a position wholly within the recess.

Other objects and advantages will become apparent from the following specification taken in conjunction with the accompanying drawings.

DESCRIPTION OF THE DRAWINGS

FIG. 1 is a fragmentary, side elevation of a vehicle in which the inventive hinge pin construction may be employed;

FIG. 2 is an enlarged, sectional view taken approximately along the line 2—2 of FIG. 1 illustrating a prior art hinge pin construction;

FIG. 3 is an enlarged, fragmentary, sectional view of one end of a hinge pin assembly made according to the invention at approximately an initial position just prior to installation;

FIG. 4 is an elevational view of an end of the assemblage;

FIG. 5 is a view of a modified shim employed in the invention;

DESCRIPTION OF THE PREFERRED EMBODIMENTS

Figure 6:
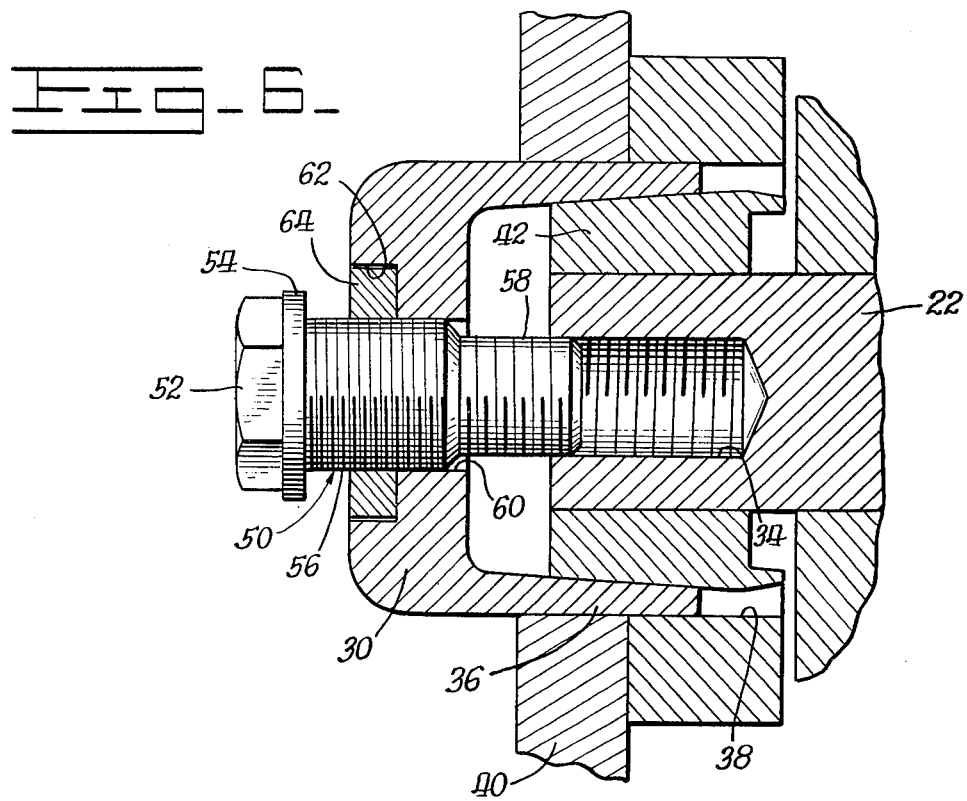
FIG. 6 is a view similar to FIG. 3 but illustrating the assemblage as the components appear when they have been seated.

One typical use of a hinge pin construction made according to the invention is illustrated in connection with a front end loader in FIG. 1 wherein a bucket 10 is mounted by hinge pins 12 on lift arms 14 suitably mounted on a vehicle 16 and powered conventionally by hydraulic cylinders. The bucket 10 is pivotal about a horizontal axis defined by the hinge pins 12 on the lift arms 14 through action of a pivot assembly, generally designated 18, pivoted to the bucket 10 at a location 20 remote from the hinge pin 12.

FIG. 2 illustrates a conventional hinge pin assembly 12 and, specifically, that illustrated in the previously identified Shankwitz et al patent. In particular, a pin 22 extends through a bore 24 in the arm 14 and has a radially inwardly, axially outwardly extending, annular tapered surface on each end defining an integral wedge member 26. While, as illustrated in FIG. 2, the wedge members 26 are integrally formed on the pin, it is also conventional that they be separately formed elements received on the ends of the pin.

Collets 30 are receivable on each of the wedge members 26 and may be advanced thereon by the tightening of bolts 32 received in threaded bores 34 in respective ends of the pins 22. Advancing of the collets 30 axially inwardly causes fingers 36 thereof to be wedged outwardly into firm, frictional engagement with the interior opening 38 in rearwardly extending ears 40 on the back of the bucket 10. As will be appreciated, proper assembly of the collet 32 to the wedge members 26 involves a great deal of friction as the collets 30 are advanced on the wedge member 26. In addition, it will be appreciated that removal of the collets 30 will be exceedingly difficult without some sort of puller tool or device. Shankwitz et al, identified previously, illustrates one such means, the details of which are herein incorporated by reference.

Turning now to FIGS. 3–7, a hinge construction made according to the invention is illustrated. Where components similar or identical to those of the prior art construction are employed, they will be given the same reference numeral.

In the embodiment illustrated in FIGS. 3–7, the pin 22 is not provided with integral wedge members 26, but rather, separate annular wedge members 42. Each end of the pin 22, however, is provided with one of the threaded bores 34. The collet 30 includes fingers 36 which may be wedged into firm frictional engagement with an opening 38 in the ears 40.

In lieu of the bolt 32, a bolt 50 is employed in the invention. The bolt 50 includes a head 52 and an adjacent washer 54. The shank of the bolt includes a large diameter portion 56 and a remote lesser diameter portion 58. The lesser diameter portion 58 is threaded so as to be threadably received within the bore 34, while the large diameter portion 56 is threadably received in a bore 60 extending through the center of the collet 30. Moreover, the threads on the portion 58 are coarse, while the threads on the portion 56 are fine. That is, the threads on the portion 56 have a finer pitch than those on the portion 58.

Figure 7:
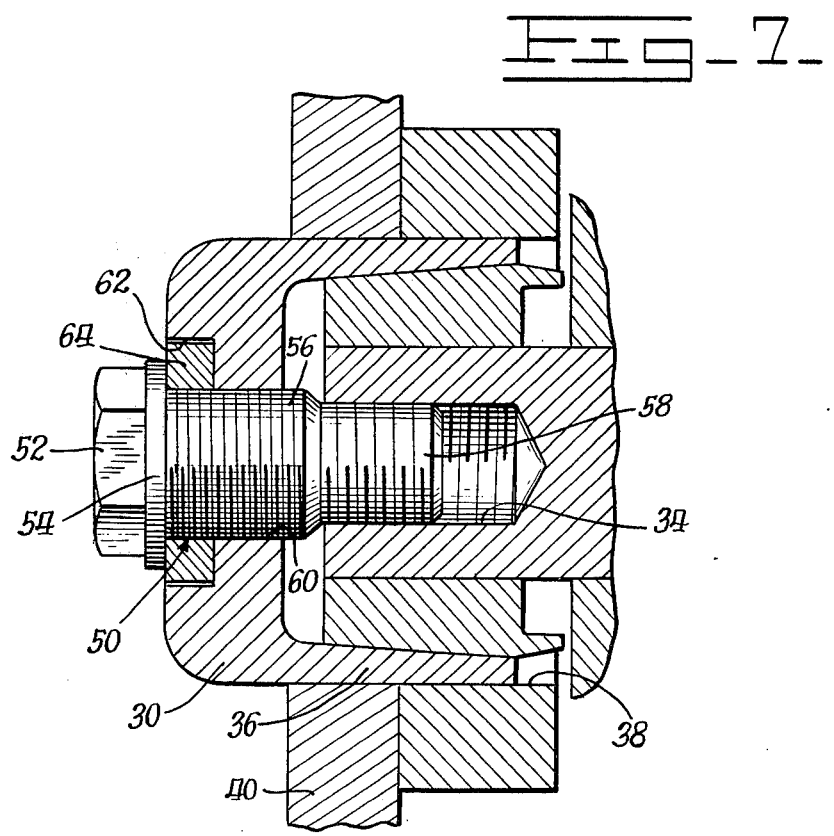
FIG. 7 is a view similar to FIGS. 3 and 6 but illustrating the components as they appear when completely set.

The axially outer end of the collet 30 is also provided with an elongated recess 62 in the form of a rectangle. As seen in FIG. 4, a spacing means in the form of an elongated shim 64 is provided and is pivotally disposed about the bolt 50 and sized to be receivable in the recess 62. As illustrated in FIGS. 3 and 4, the shim 64 is pivoted to bridge the recess 62 to limit inward movement of the head 52 relative to the collet 30 whereas FIGS. 6 and 7 illustrate the pivoting of the shim 64 approximately 90° from the position shown in FIG. 4 to be disposed within the recess 62 to allow the head 52 to be advanced toward the collet 30.

If desired, the shim 64 can be dispensed with and a wholly removable shim 66 having an open ended slot 68 for receipt about the bolt can be employed.

Installation and removal and the advantages of the inventive construction during such procedures will now be described.

Initially, the components are oriented as illustrated in FIG. 2 with the spacer 64 or the spacer 66 disposed to limit movement of the head 52 toward the collet 30. The lesser diameter portion 58 is introduced into bore 34 and the bolt rotated. At this time, the fingers 36 of the collet 30 will not encounter any appreciable resistance to entry into the bore 38 and the collet 30 will rotate with the bolt 50, with minimal resistance.

At some point in time, the inner surface of the fingers 36 will engage the tapered surface of the wedge members 42, while the outer surfaces of the fingers 36 will frictionally engage the aperture 38. The bolt 50 may continue to be tightened to any desired predetermined torque with the consequence that the parts will be seated. This configuration is generally that illustrated in FIG. 6 except that the spacer 64 would be in the position illustrated in FIG. 3 rather than as shown in FIG. 6.

The bolt may then be backed off sufficiently so as to allow the spacer 64 to be rotated to be disposed within the recess 62 or, if the spacer 66 is employed, to be removed entirely. The bolt 50 may then further be tightened until the position of the components illustrated in FIG. 7 is achieved. Because of the difference in pitch, the bolt 50 will advance to the right, as viewed in the FIG., at a more rapid rate than the collet 30 so as to allow the collet 30 to be seated properly but with a minimum of friction due to such axial movement. Thus, installation is substantially simplified.

For removal, the reverse of the foregoing procedure will be employed, although it is unnecessary to utilize the spacer at any point in the process. It will be recognized that as the bolt 50 is backed out of the bore 34, the collet 30 will be backed off of the wedge member 42 and the wedging surface 26 thereof at a lesser rate allowing disassembly, again, with a minimum of effort.

We claim:

1. In a hinge pin construction including a pin adapted to journal an arm or the like, an annular wedge member associated with one end of said pin, a collet receivable on the wedge member, and a blot extending through the collet to be threadably received in a bore in the pin, the improvement wherein said bolt is also threadably received in said collet, the threads in said collet having a lesser pitch than the threads in said bore, and selectively operable spacer means disposed between said collet and the head of said bolt.

2. The hinge pin construction of claim 1 wherein said spacer means comprises a removable shim.

3. The hinge pin construction of claim 1 wherein said collet, adjacent the head of said bolt, is provided with an elongated recess, and said spacer means comprises an elongated shim pivotally impaled on said bolt and sized to be receivable within said recess.

4. The hinge pin construction of claim 1 wherein said annular wedge member is formed separately of said pin.

* * * * *